July 31, 1951  J. R. HOLLINS  2,562,271
AUXILIARY ENERGIZING CIRCUIT FOR VEHICLE SIGNAL LAMPS
Filed Oct. 23, 1947
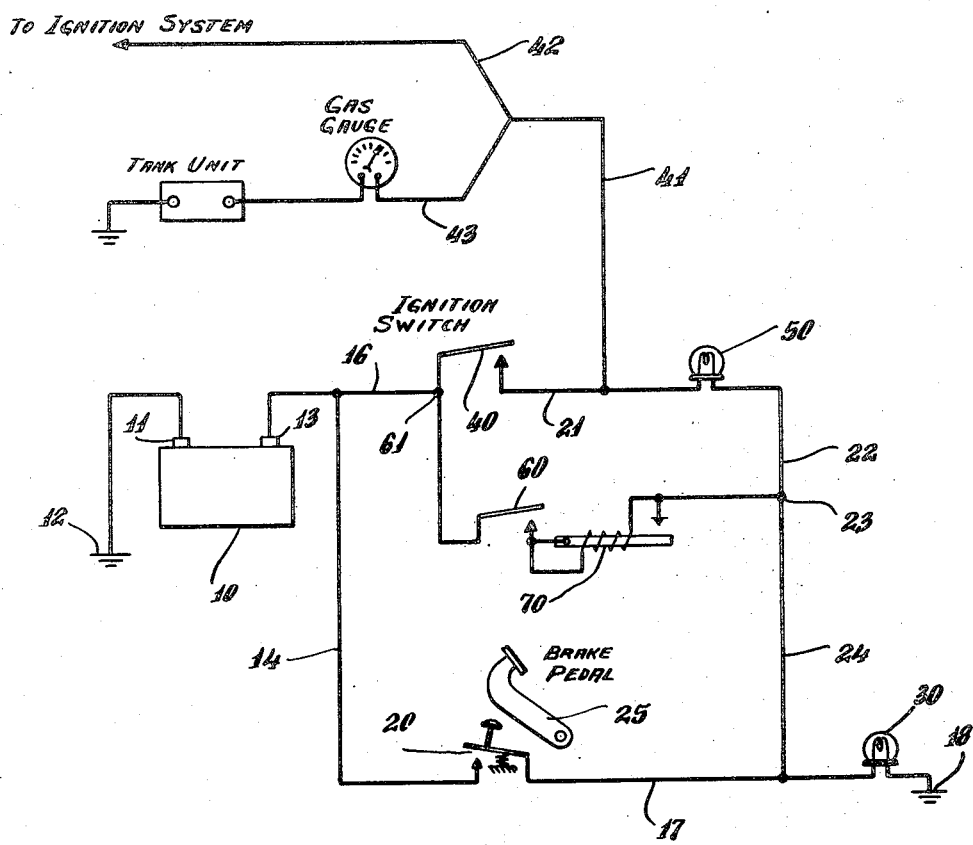
INVENTOR.
Jesse R Hollins
BY
ATTORNEY.

Patented July 31, 1951

2,562,271

UNITED STATES PATENT OFFICE 2,562,271

AUXILIARY ENERGIZING CIRCUIT FOR VEHICLE SIGNAL LAMPS

Jesse R. Hollins, New York, N. Y.

Application October 23, 1947, Serial No. 781,680

6 Claims. (Cl. 177—337)

1

This invention relates to electrical lighting and signalling circuits for motor vehicles; and more particularly to a dual function warning lamp system including an indicator effective not only to indicate the operative condition of the normal energizing circuit for a warning lamp but also to indicate the condition of an auxiliary warning lamp energizing circuit used to signal an emergency condition of the vehicle.

Modern motor cars are generally completely equipped with an electric lighting and signal system including head lamps, tail lamps, directional lamps and brake operated stop lamps, certain of which lamps function during operation of the vehicle to properly advise other drivers of anticipated movements of the vehicle, such as stopping and turning, for example. However, the usual warning lamp arrangements are inadequate to indicate an emergency parked condition of the vehicle, such as for tire or engine repairs or the like.

When the vehicle is parked for any purpose, the stop lamps are not lighted, as these lamps operate only in response to depression by the foot brake pedal. Thus, with the usual lamp complement, only the parking and tail lamps are lit, indicating only a normally parked condition. The parking lamps, and more particularly the tail lamps, are not of sufficient brilliance and do not have a characteristic appearance to serve as emergency warning lights. Consequently, no adequate warning is given, to cars approaching from the rear, that the vehicle is stopped, as the lighted tail lamps do not indicate whether the vehicle is moving or halted.

To obviate this condition, emergency vehicles such as tow trucks, repair trucks and the like, are usually provided with an auxiliary warning lamp system, generally including flashing red lamps or the like. Likewise, trucks usually carry emergency flares to set out when the truck is parked on the roadway for repairs. However, private passenger cars have not been thus equipped, due either to the additional expense for supplementary lighting or to the lack of space for conveniently carrying flares or the like. Occasionally, the stop lamps of passenger vehicles are equipped with flashers, but these act to more effectively indicate a slowing down of the vehicle.

In accordance with the present invention, the usual lighting circuits provided on a passenger vehicle are inexpensively modified to selectively provide warning indications when the vehicle is parked on a roadway under emergency condi-

2 tions. Typically, an auxiliary, manually controlled circuit is provided for one set of lamps such as the tail or stop lamps, and a flasher device is incorporated in such auxiliary circuit. Consequently, when the vehicle is parked under emergency conditions, a manually operated switch is closed and the tail or stop lamps flash on and off to indicate such emergency stop. Preferably the auxiliary circuit is connected to the stop lamps, which generally have a greater brilliancy than the tail lamps, and the auxiliary circuit shunts the brake pedal operated switch.

An important feature of the invention is the inclusion of an indicator, such as a pilot lamp, in the stop lamp circuit. The pilot lamp is connected in series between the ignition switch and the stop lamps, so that, when the ignition switch is closed, the pilot lamp is lit if the stop lamp circuit is operative. The pilot lamp has such a high resistance that the current flow through the stop lamp is insufficient to light the latter. When the brakes are operated, the low resistance stop lamp circuit through the brake operated switch shunts the high resistance stop lamp circuit through the ignition switch and pilot lamp, and the latter is extinguished if the stop lamp circuit through the brake switch is operative, but continues to glow if such stop lamp circuit is open, due to burning out of the stop lamp, for example.

The manually closed auxiliary circuit shunts the ignition switch and also the brake operated switch but is so arranged that, when the manually operated switch is closed, both the pilot lamp and the stop lamps are connected to the battery or generator through the auxiliary circuit and are connected in parallel circuit relation to ground. Consequently, both the pilot lamp and the stop lamps are lit, and the pilot lamp indicates the operativeness of the auxiliary circuit including the flasher.

Thus, it is an object of the present invention to provide a novel and inexpensive dual function warning lamp circuit for a motor vehicle.

Another object is to provide such a circuit using only warning lamps customarily provided on motor vehicles, and effective to operate such warning lamps in a distinctive manner to indicate an emergency stopping of the vehicle.

Another object is to provide an auxiliary manually controlled energizing circuit, for vehicle stop lamps, shunting the usual foot brake pedal operated switch and incorporating a flasher.

Another object is to provide a stop lamp arrangement including a pilot lamp normally in series with the stop lamps and connected in parallel therewith by such auxiliary circuit.

These and other objects, advantages, and novel features of the invention will be apparent from the following description and the accompanying drawing, in which the single figure is a schematic wiring diagram of a preferred embodiment of the invention.

Referring to the drawing, the invention is illustrated as incorporated in an automobile stop lamp system, including a source of electrical energy, such as the usual storage battery indicated at 10, a brake operated, normally open switch 20 arranged to be closed by depression of brake pedal 25, and a stop lamp 30. One terminal 11 of battery 10 is grounded, in the usual manner, as at 12. The other battery terminal 13 is connected, by circuit 14, to brake operated switch 20, and by circuit 16 to ignition switch 40. Circuit 17 connects the other terminal of switch 20 to an ungrounded terminal of stop lamp 30, and the other lamp terminal is grounded, as at 18. With the described arrangement, whenever pedal 25 is depressed switch 20 will close the circuit to light lamp 30.

An indicating or pilot lamp 50 is provided for stop lamp 30, to act as a tell-tale for the stop lamp circuit. Pilot lamp 50 has one terminal connected to ignition switch 40, through circuit 21, and its other terminal connected to the ungrounded terminal of stop lamp 30 through circuit 22, junction 23, circuit 24 and circuit 17.

Accordingly, whenever ignition switch 40 is closed, current flows through lamps 50 and 30 in series, if all the circuits are operative. Due to the relatively high resistance of pilot lamp 50, the current flow will not be sufficient to illuminate stop lamp 30. Should lamp 50 fail to light, an inoperative condition of the circuits or of lamp 30 will be indicated.

When pedal 25 is depressed, switch 20 is closed, providing a low resistance stop lamp circuit shunting pilot lamp 50. Stop lamp 30 is now illuminated, and pilot lamp 50 is extinguished, if the circuit connections are all in order. Should lamp 50 fail to extinguish, an open circuit condition will be indicated as current will flow through circuits 24 and 22 and lamp 50 to ground through circuit 41 and one or both of the parallel circuits 42, 43, for the ignition system and gas gauge, to ground.

The novel feature of the present invention resides in the auxiliary energizing circuit for stop lamp 30. This circuit includes a manually operable switch 60 having a terminal connected to the live terminal 61 of ignition switch 40. The other terminal of switch 60 is connected, through a flasher 70, to junction point 23.

When the vehicle is stopped on the roadway for tire repairs, or the like, the operator closes switch 60. This energizes flasher 70 to intermittently make and break an auxiliary circuit for stop lamp 30, causing the lamp to flash on and off. The flashing stop lamp 30 warns approaching drivers that the vehicle is halted and not in motion. At the same time, pilot lamp 50 flashes off and on, as it is connected to ground, in parallel with stop lamp 30, through point 23 and circuits 22, 41 and 43. Thus, the operator is apprised of the fact that stop lamp 30 is energized over the auxiliary circuit, and also of the operation of flasher 70.

The described invention thus provides a novel emergency warning lamp system for the vehicle, requiring only an inexpensive modification of existing warning lamp circuits. This emergency signal may be provided by the usual tail lamps or by the stop lamps, but the latter are preferred due to their greater brilliance and also because the tail lamps cannot be lighted without lighting at least the vehicle parking lamps. Pilot lamp 50 normally is in series with lamp 30 to act as a circuit condition tell-tale, and is connected in parallel with lamp 30, when switch 60 is closed, to act as a tell-tale for flasher 70.

While a specific embodiment of the invention has been shown and described in detail to illustrate the application of the principles thereof, it will be understood that the invention may otherwise be embodied without departing from such principles.

What is claimed is:

1. In a motor vehicle electrical system, comprising a source of energy, a signal lamp and a high resistance indicator lamp, and wherein said signal lamp has a grounded terminal and said indicator lamp has a grounded terminal, a first energizing circuit for connecting said indicator lamp in series circuit relation between the source of electrical energy and the ungrounded terminal of the signal lamp, whereby the indicator lamp is selectively illuminated, a second energizing circuit for connecting said signal lamp and indicator lamp in shunt circuit relation with each other between said source of energy and ground, whereby to selectively illuminate said signal lamp and a third energizing circuit, including a flasher, for commonly connecting each said signal lamp and said indicator lamp in series circuit relation with said source of electrical energy and in shunt circuit relation with each other between said source of electrical energy and ground, whereby both said signal and indicator lamps are intermittently illuminated.

2. A motor vehicle electrical system in accordance with claim 1, wherein said second energizing circuit includes a brake pedal operated switch connected in series between said source of electrical energy and said signal lamp, whereby said signal lamp is selectively illuminated when said brake pedal operated switch is closed.

3. A motor vehicle electrical system in accordance with claim 1, wherein the third energizing circuit includes a manually operable switch means and a flasher, whereby both signal and indicator lamps are intermittently illuminated when said manually operated switch is closed.

4. In a motor vehicle electrical system comprising a source of energy, a signal lamp having a grounded terminal, and a high resistance indicator lamp connected in series circuit relation between the source of electrical energy and the ungrounded terminal of said signal lamp, the terminal connecting said indicator lamp to said source of electrical energy also being connected to ground, and an energizing circuit, including manually operable switch means and a flasher, for commonly connecting both signal and indicator lamp each in series circuit relation with said source of electrical energy and in shunt circuit relation with each other to ground, whereby both signal and indicator lamps are intermittently illuminated when said manually operable switch means are closed.

5. A motor vehicle electrical system in accordance with claim 4, wherein an additional energizing circuit, including a brake pedal operated switch, is provided for connecting the signal lamp and indicator lamp in shunt circuit relation with each other between said source of electrical energy and ground, whereby to selectively illuminate said signal lamp when said brake pedal switch is closed.

6. A motor vehicle electrical system in accordance with claim 4, wherein an additional energizing circuit is provided for commonly connecting both signal lamp and indicator lamp each in series circuit relation with said source of electrical energy and in shunt circuit relation with each other to ground, whereby the indicator lamp is selectively and constantly illuminated when the manually operable switch means of the first energizing circuit is open.

JESSE R. HOLLINS.

REFERENCES CITED

The following references are of record in the file of this patent:

UNITED STATES PATENTS

| Number | Name | Date |
|---|---|---|
| 250,764 | Starr | Dec. 13, 1881 |
| 1,228,263 | Topping | May 29, 1917 |
| 1,535,263 | Smetzer | Apr. 28, 1925 |
| 1,909,712 | Oppegaard | May 16, 1933 |